United States Patent [19]

Schroeder

[11] 4,336,019

[45] Jun. 22, 1982

[54] EDUCATIONAL ACCOUNTING GAME

[76] Inventor: Thomas D. Schroeder, 7 Woodbine St., S. Burlington, Vt. 05401

[21] Appl. No.: 201,116

[22] Filed: Oct. 28, 1980

[51] Int. Cl.³ .............................................. G09B 19/18
[52] U.S. Cl. .................................................... 434/109
[58] Field of Search ............... 434/107, 109, 167, 207; 273/278, 282

[56] References Cited

U.S. PATENT DOCUMENTS

| | | | |
|---|---|---|---|
| 2,128,749 | 8/1938 | Koch et al. | 434/167 X |
| 2,369,804 | 2/1945 | Schoolfield et al. | 434/167 |
| 3,204,343 | 9/1965 | Pollock | 434/207 X |
| 4,008,527 | 2/1977 | Zegel | 434/109 |
| 4,142,305 | 3/1979 | Zegel | 434/109 |

Primary Examiner—William H. Grieb
Attorney, Agent, or Firm—Sughrue, Mion, Zinn, Macpeak and Seas

[57] ABSTRACT

An accounting game comprising a rectangular gameboard having two sets of blank columns printed thereon and a sheet of separable game pieces each having an accounting type legend thereon or a numerical legend. The front surface of the gameboard and the rear surface of the game pieces are flocked to provide felt-like surfaces to prevent slippage of the pieces on the gameboard. One set of columns is for assets and the other set of columns is for liabilities and owners equity.

2 Claims, 2 Drawing Figures

EDUCATIONAL ACCOUNTING GAME

BACKGROUND OF THE INVENTION

1. Field of the Invention

The present invention is directed to an educational accounting game and more specifically to an educational accounting game having a felt-like game board having a plurality of blank lines resembling a balance sheet and a plurality of game pieces having legends or numbers on one side and a felt-like backing on the opposite side for suitable placement on the game board.

2. Prior Art

Various educational accounting devices or games have been available for years but have generally involved complicated apparatus which is cumbersome and/or costly to manufacture. Other accounting devices involve the use of pre-printed or marked entry guides which limited their flexibility as a teaching tool.

An example of such a prior art device is disclosed in U.S. Pat. No. 4,008,527, which is comprised of a plurality of transaction cards adapted for use with an educational accounting device. Each card bears accounting indicia on its upper and lower portions and a pair of numeral-bearing discs are mounted adjacent to the upper and lower portions of the card. The displayed numerals together with the accounting indicia represent part of an accounting entry which is then inserted into an appropriately labeled pocket on one of a plurality of ledger pages.

Another form of a prior art teaching aid for accounting is disclosed in U.S. Pat. No. 4,142,305 which is comprised of a flat rectangular bookkeeping entry guide bearing accounting indicia. A plurality of chips are provided which are shaped to fit into recesses in the entry guide. A plurality of accounting cards are also provided along with labels for each card and the accounting cards also have recesses shaped to receive entry chips.

SUMMARY OF THE INVENTION

The present invention provides a novel teaching aid for simply and effectively demonstrating the rudimentary principles of double entry accounting. More specifically, the present invention provides a novel game-like teaching device for illustrating the inter-relationship of assets, liabilities, and capital and the several accounts which may exist under each category. The fundamental equation illustrated by the present invention is "assets equal liabilities plus owner's equity".

The present invention provides a novel bookkeeping entry guide device comprising a game board having two sets of blank boxes and a plurality of game pieces having appropriate legends for placement on the game board. The upper surface of the game board and their reverse side of the game pieces have a felt-like texture for retaining the game pieces temporarily in place on the board.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 2 is a plan view of the game pieces assembled in a single sheet prior to being separated into individual pieces.

DETAILED DESCRIPTION OF THE INVENTION

Figure 1:
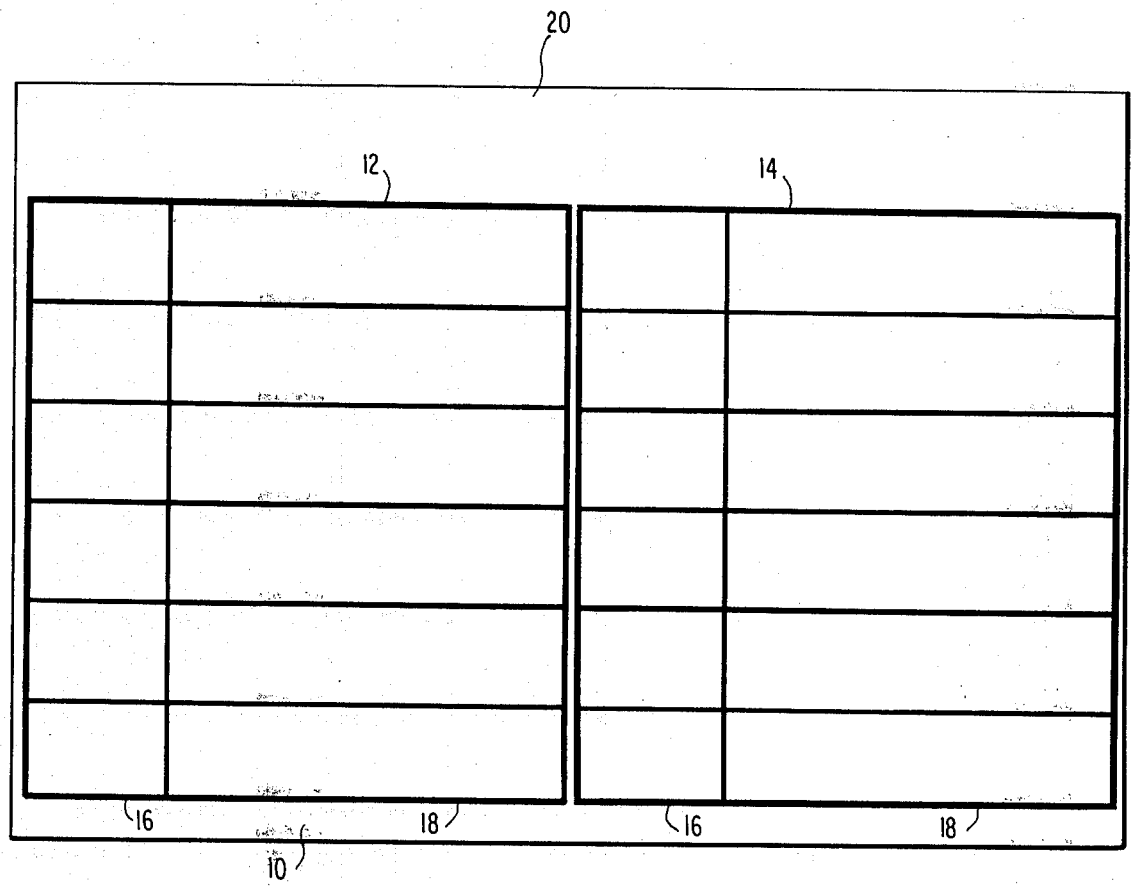
FIG. 1 is a plan view of the game board according to the present invention.

The educational accounting game according to the present invention is designed primarily to facilitate an understanding of double entry accounting in the creation of balance sheets. The game board 10 shown in FIG. 1 is constructed of a relatively light-weight flexible cardboard material having flocking on the upper surface thereof to create a felt-like surface. Two sets of boxes 12 and 14 are printed on the surface of the board with each set having a column 16 of small boxes and a column 18 of larger boxes.

In the manufacture of the game the game pieces are printed on a single sheet of relatively light-weight cardboard similar to that of the game board as shown in FIG. 2. The reverse side of the sheet of game pieces is provided with flocking to create a felt-like surface so that upon placement of the individual pieces on the game board they will temporarily be held in the correct position without slipping. The sheet of game pieces is scored to define each individual piece so that the individual pieces can readily be separated from each other. The different shading of the pieces as illustrated in FIG. 2. represents different colors so that a number of numerical pieces match the color of a specific label piece. Any colors may be chosen for the different categories and the shading shown in FIG. 2 is only for purposes of illustrating a difference is color.

In order to play the game the individual pieces are separated from each other and the large piece bearing the legend "assets=liability+owners equity" is placed on the board in the space 20 above the two sets of boxes. Thus, the set of boxes 12 will be used to enter various assets and the set of boxes 14 will be used to enter the liabilities and owners equity. The game pieces bearing legends such as "accounts receivable" and notes payable would be entered in the appropriate column 16 depending upon the nature of the item and the numerical game pieces would be entered in the columns 18. A suitable instruction booklet would accompany the game setting forth various examples of balance sheets which could be put together on the game board using the various game pieces.

An example of an educational game using the game board and pieces describedd above will now be described in detail. This game is called "The Lemonade Game" and relates to the illustrations on the various game pieces. In this example you invest $2.00 into the lemonade business and you borrow $5.00 from your mother. With this cash you then purchase 50 lemons at 10¢ per lemon at a total cost of $5.00 and 5 pounds of sugar at 20¢ per pound for a total cost of %1.00. At this stage the balance sheet would be assembled by placing the game pieces bearing the legends "cash" and "inventory" in the column 16 under the heading Assets. A numerical game piece having the same color as the "cash" game piece and bearing the legend 1 would be inserted in column 118 next to the "cash" game piece. Numerical game pieces totalling up to 6 would be placed in column 18 next to the "inventory" game piece.

Under the heading "liabilities+owners equity" the game pieces bearing the legends "accounts payable" and "original investment" would be placed in column 16 of the seet of boxes 14. Numerical game pieces totalling 5 would be placed in column 18 next to the "accounts payable" game piece and numerical game pieces totalling 2 would be placed in column 18 next to the "original investment" game piece. Thus, the total assets of $7.00 would equal the liabilities+owners equity of $7.00.

As the business progresses, sales are made and the loan is completely or partially pad back the balance sheet can readily be changed to reflect the current state of business.

While only game pieces bearing specific legends and numerical values have been illustrated for sake of example, it is obvious that game pieces having other legends and values could be provided for purposes of illustrating more complicated games which would be set forth in the instruction booklet. It is obvious that the paper stock upon which the game is printed could vary widely and that the design, shape and size of the game pieces could be modified. Therefore, while the invention has been particularly shown and described with respect to a preferred embodiment thereof, it will be understood by those skilled in the art that various changes in form and details may be made therein without departing from the spirit and scope of the invention.

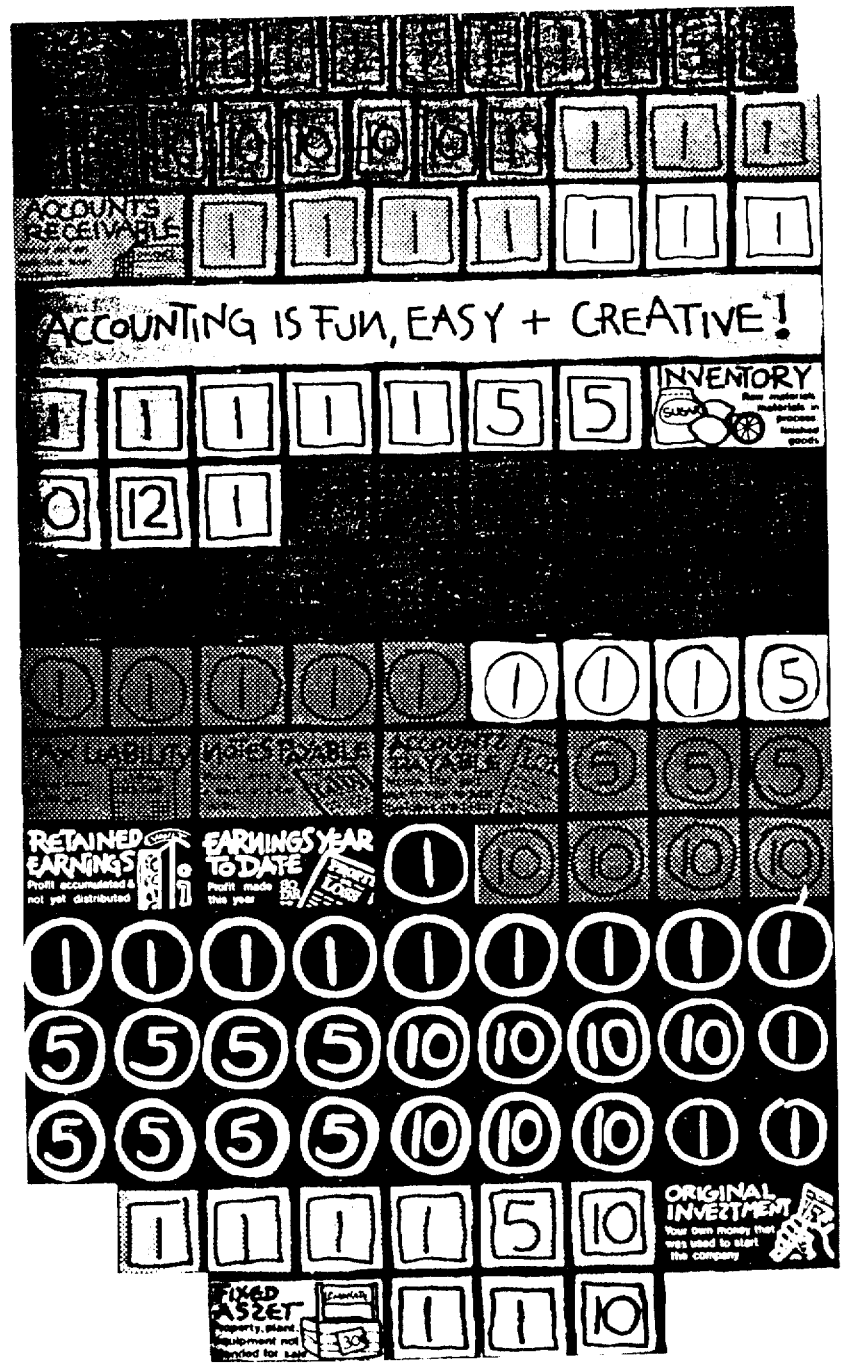

What is claimed is:

1. An educational accounting game comprising a game board having four columns of boxes printed thereon, two for assets and two for liabilities, and a sheet of separable game pieces having accounting legends and assorted numerical values printed thereon, the printed surface of the game board and the surface of said sheet of game pieces opposite the printing having complementary engaging means thereon for temporarily holding individual game pieces in position on said game board and each game piece having an accounting legend thereon being of a different color and said game pieces having numerical values thereon being of different colors corresponding to the colors of the game pieces having accounting legends thereon whereby those pieces having a legend designating an asset are placed in the first column, those pieces having a legend designating a liability are placed in the third column and those pieces having numerical values thereon are placed in the second and fourth columns according to color.

2. An educational accounting game as set forth in claim 1, wherein said complementary engaging means comprise flocking secured to said surfaces to provide felt-like surfaces.

* * * * *

UNITED STATES PATENT AND TRADEMARK OFFICE
CERTIFICATE OF CORRECTION

PATENT NO. : 4,336,019

DATED : June 22, 1982

INVENTOR(S) : Thomas D. Schroeder

Page 1 of 2

It is certified that error appears in the above-identified patent and that said Letters Patent is hereby corrected as shown below:

Figure 2 should appear as shown on per attached sheet.

Signed and Sealed this

Eighth Day of November 1983

[SEAL]

Attest:

GERALD J. MOSSINGHOFF

Attesting Officer

Commissioner of Patents and Trademarks